United States Patent
Takezawa

(10) Patent No.: US 11,859,747 B2
(45) Date of Patent: Jan. 2, 2024

(54) SAFETY JOINT

(71) Applicant: TATSUNO CORPORATION, Tokyo (JP)

(72) Inventor: Masahiro Takezawa, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 18/081,326

(22) Filed: Dec. 14, 2022

(65) Prior Publication Data

US 2023/0213150 A1    Jul. 6, 2023

(30) Foreign Application Priority Data

Jan. 5, 2022 (JP) .................. 2022-000701

(51) Int. Cl.
| | |
|---|---|
| *F16L 37/32* | (2006.01) |
| *F17C 13/04* | (2006.01) |
| *F16L 37/35* | (2006.01) |
| *F17C 5/00* | (2006.01) |

(52) U.S. Cl.
CPC .............. *F16L 37/32* (2013.01); *F16L 37/35* (2013.01); *F17C 5/007* (2013.01); *F17C 13/04* (2013.01); *F17C 2205/0332* (2013.01); *F17C 2221/012* (2013.01); *F17C 2265/065* (2013.01); *F17C 2270/0168* (2013.01)

(58) Field of Classification Search
CPC ............ F16L 37/32; F16L 37/35; F17C 13/04
See application file for complete search history.

(56) References Cited

U.S. PATENT DOCUMENTS

| | | | | | |
|---|---|---|---|---|---|
| 4,709,726 | A | * | 12/1987 | Fitzgibbons | .......... E21B 33/038 137/614.04 |
| 5,144,979 | A | * | 9/1992 | Shobuzako | .............. F16L 37/23 137/614.04 |
| 8,132,780 | B2 | * | 3/2012 | Tibbitts | .................... F16L 21/03 137/614.04 |
| 8,695,651 | B2 | * | 4/2014 | Frenal | ..................... F16K 1/308 141/286 |
| 9,664,319 | B2 | * | 5/2017 | Weiland | .................. F16L 37/32 |
| 10,442,287 | B2 | * | 10/2019 | Takezawa | ............... F17C 5/007 |
| 10,525,820 | B2 | * | 1/2020 | Takezawa | ........... H01M 8/0656 |
| 10,598,294 | B2 | * | 3/2020 | Takezawa | ............. F16K 17/20 |
| 10,704,725 | B2 | * | 7/2020 | Takezawa | ........... F16L 55/1015 |
| 10,870,570 | B2 | * | 12/2020 | Takezawa | ............ B67D 7/3218 |
| 2010/0327575 | A1 | * | 12/2010 | Blanchard | ........... F16L 37/1215 285/34 |
| 2014/0373949 | A1 | * | 12/2014 | Manzato | ................. F16L 37/32 137/614.04 |
| 2018/0149316 | A1 | * | 5/2018 | Chattaway | ............. F17C 13/06 |

FOREIGN PATENT DOCUMENTS

| | | | | |
|---|---|---|---|---|
| DE | 102017005588 A1 | * | 12/2018 | ............. B60K 15/00 |
| JP | 2021101115 A | * | 7/2021 | |
| JP | 2021101115 A | | 7/2021 | |

* cited by examiner

*Primary Examiner* — David Colon-Morales
(74) *Attorney, Agent, or Firm* — Stetina Brunda Garred & Brucker

(57) ABSTRACT

To provide a safety joint that can prevent an O-ring from falling off due to an ultra-high pressure hydrogen gas flowing through a flow passage in the safety joint at high speed and from being damaged by a foreign matter coming into contact with the O-ring if the foreign matter is mixed in the hydrogen gas.

4 Claims, 7 Drawing Sheets

[Fig. 1]
(PRIOR ART)
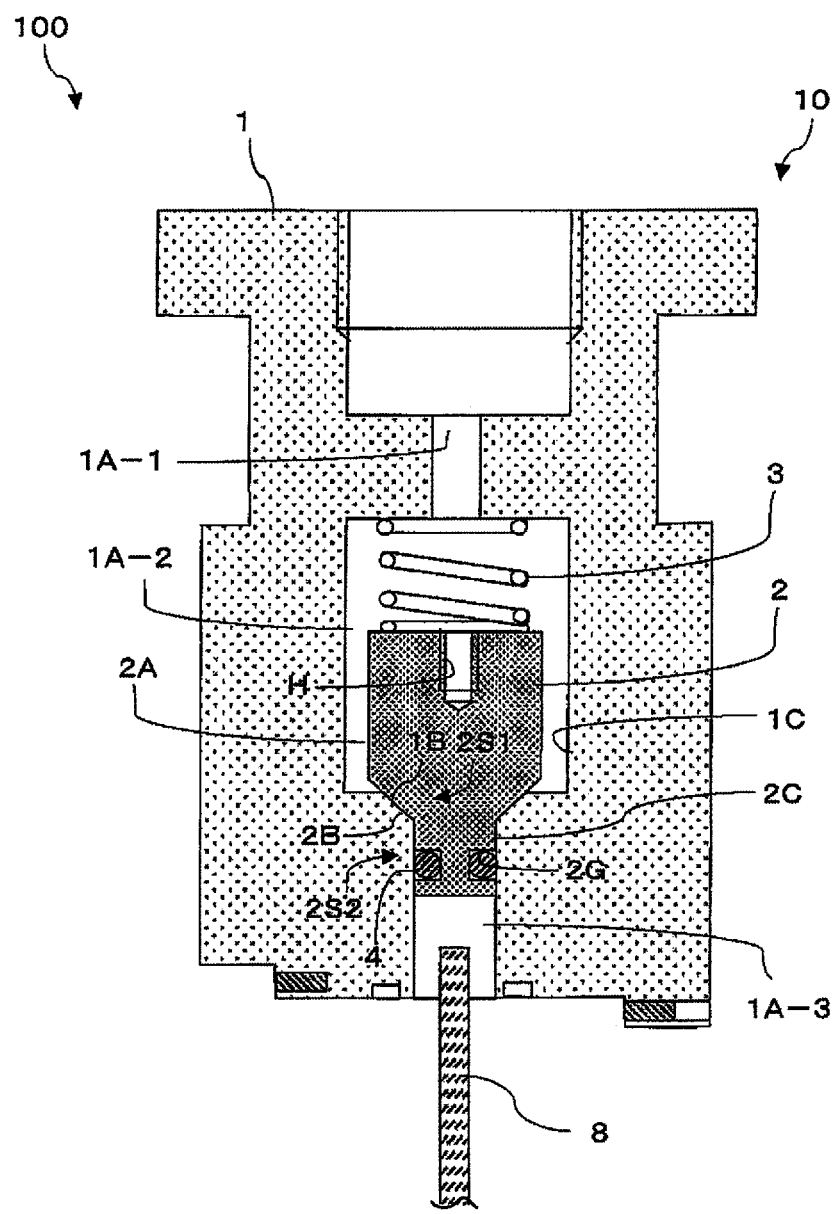

[Fig. 2] (PRIOR ART)
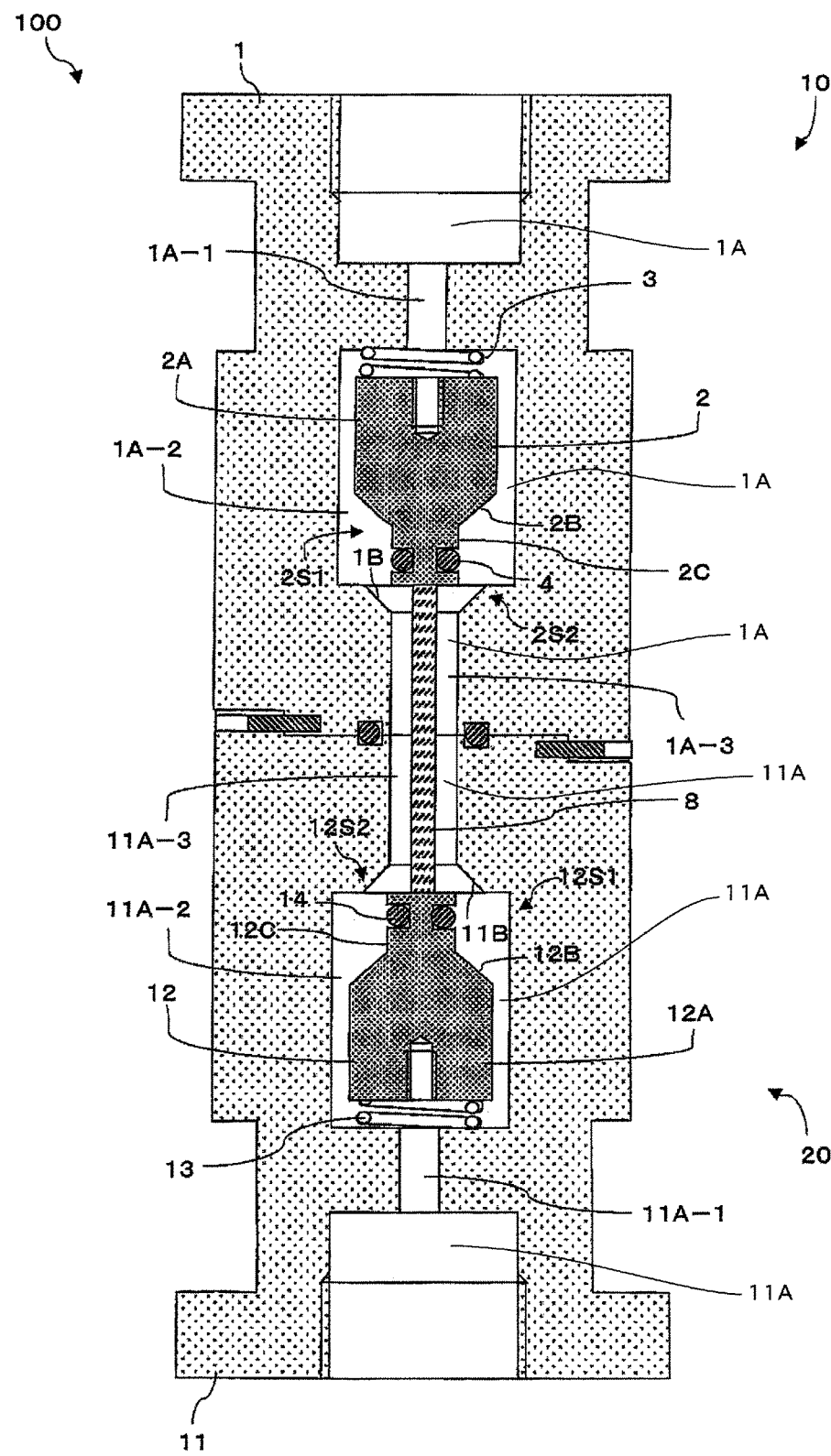

[Fig. 3]
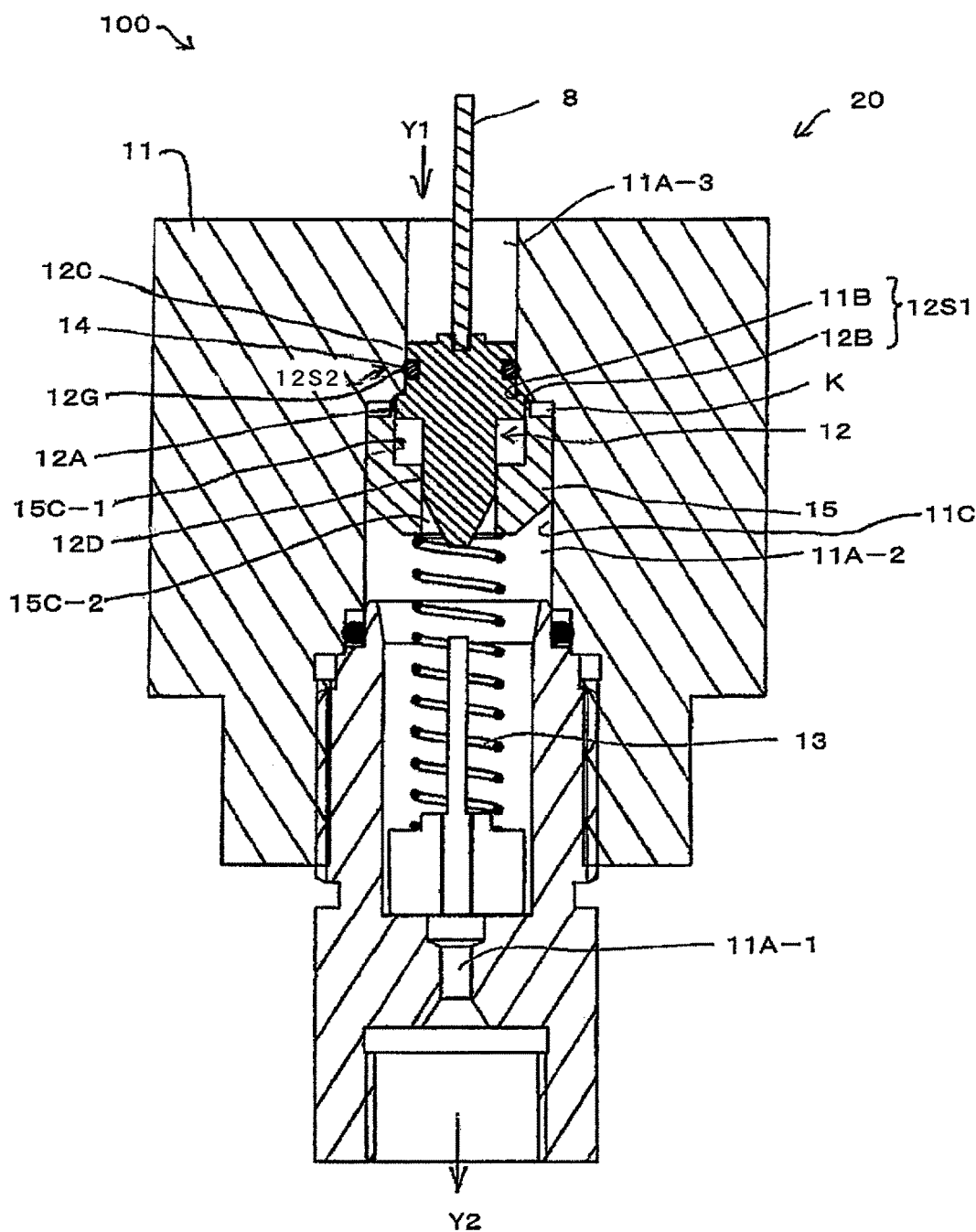

[Fig. 4]
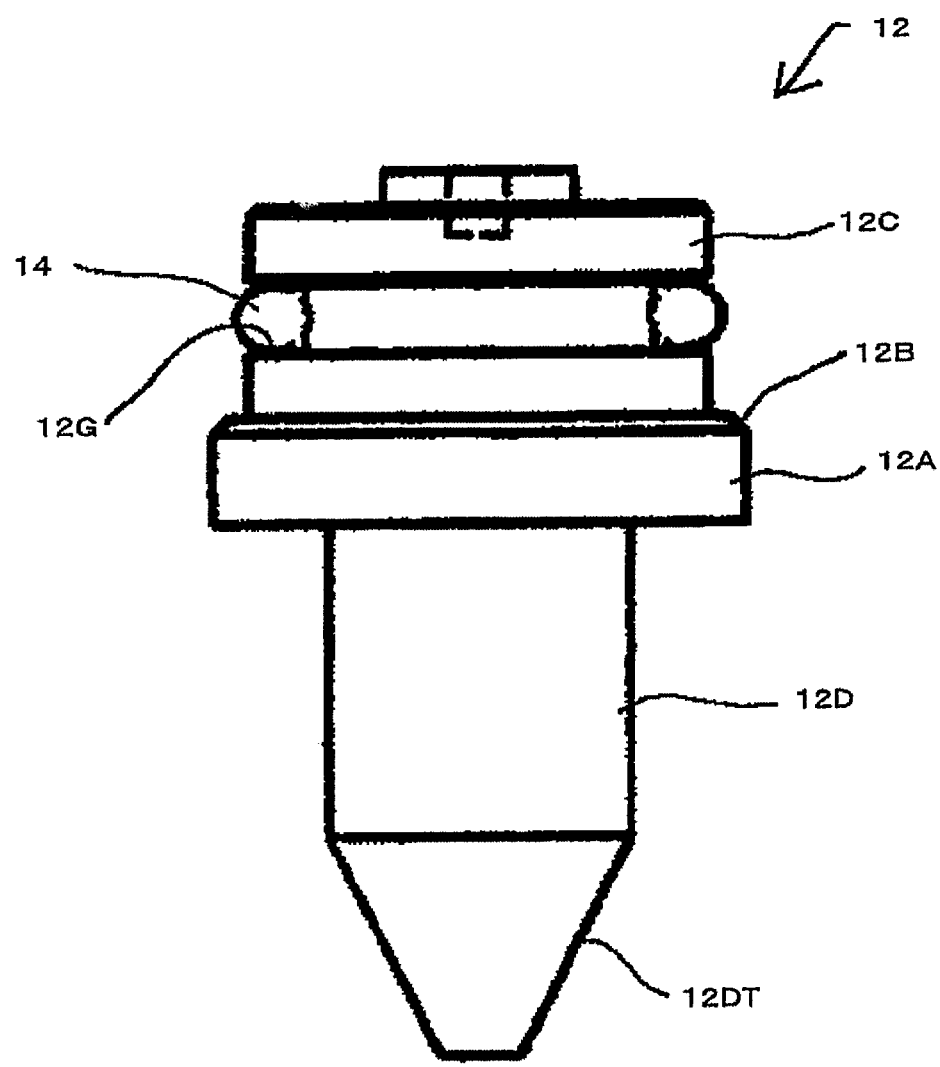

[Fig. 5]
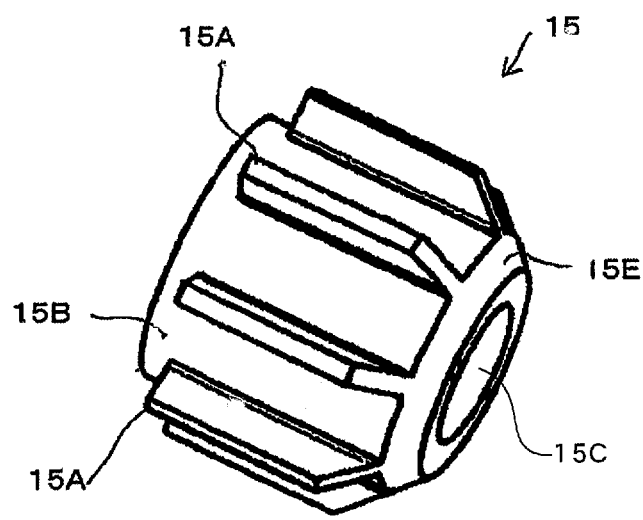
[Fig. 6]
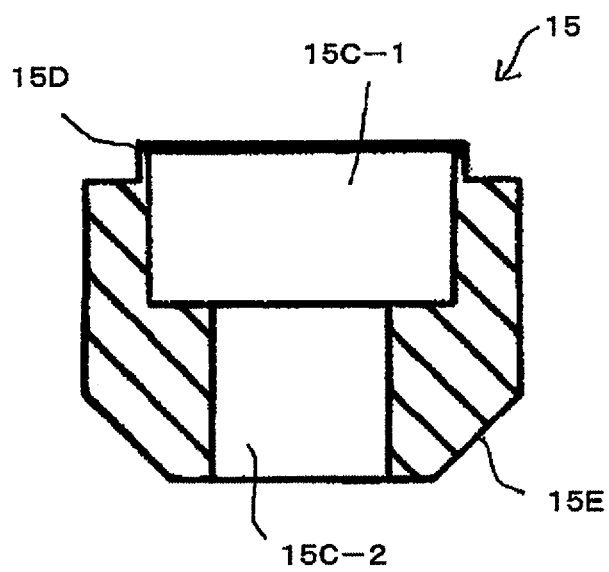

[Fig. 7]
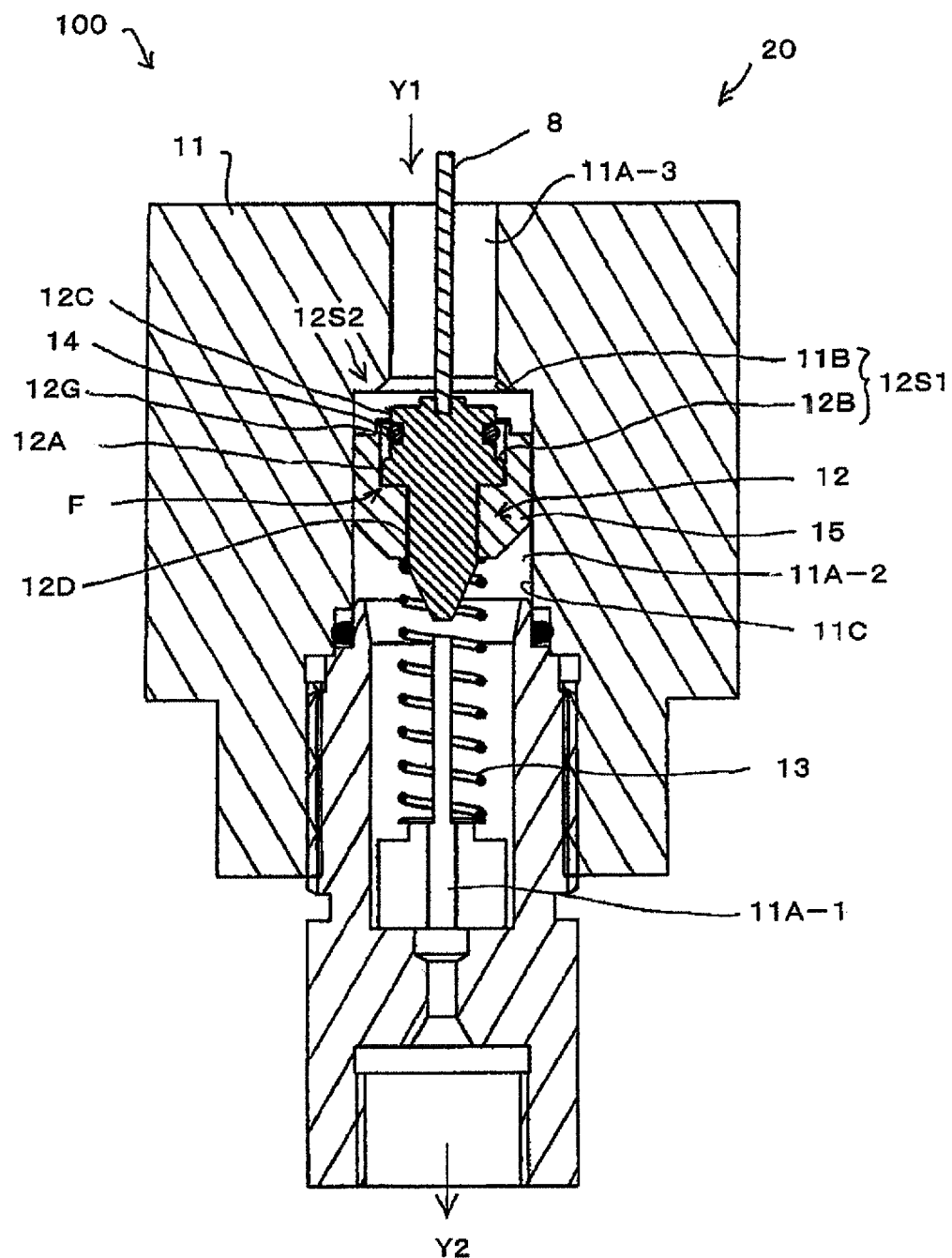

[Fig. 8]
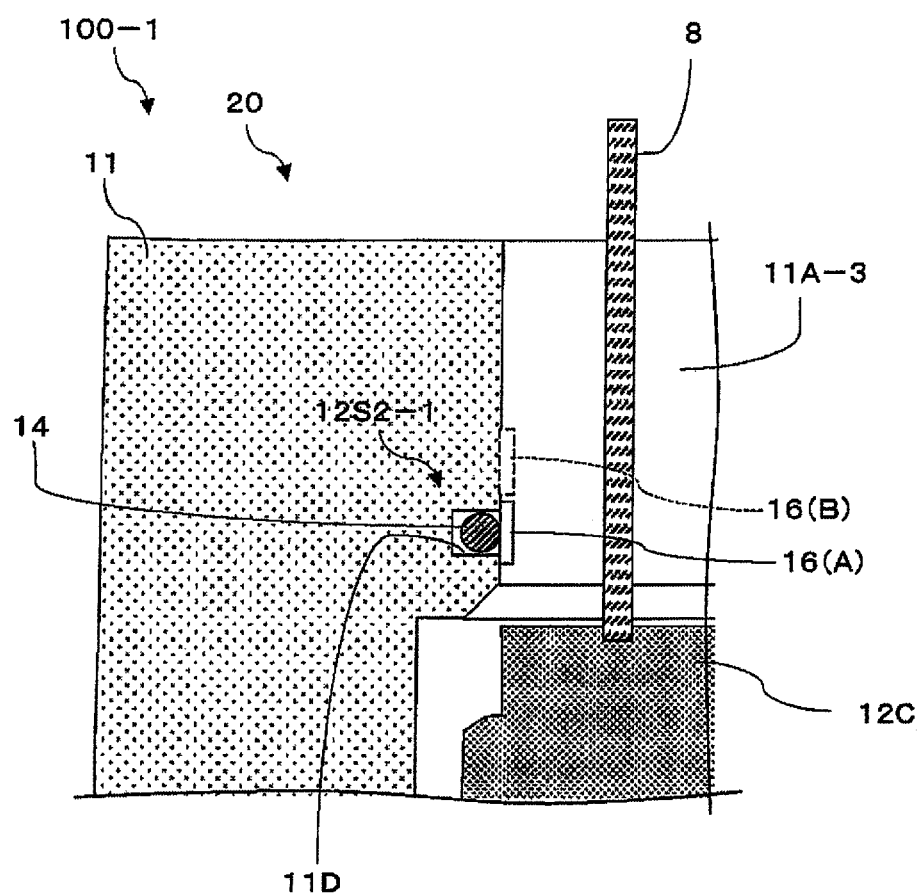

SAFETY JOINT

CROSS-REFERENCE TO RELATED APPLICATIONS

The present application claims priority to Japanese Patent Application No. 2022-000701 filed on Jan. 5, 2022, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a safety joint used in a fuel supply device such as a hydrogen gas filling device that supplies fuel such as hydrogen gas, and has a function of separating the fuel supply device and a filling hose in an emergency.

2. Description of the Related Art

In line with the growing awareness of environmental issues in recent years, fuel cell vehicles and hydrogen gas vehicles that use hydrogen gas as fuel, and hydrogen gas filling devices that stably and efficiently fill the tanks of such vehicles with gas fuel are widespread. In such a hydrogen gas filling device, a safety joint is required to reliably and safely separate a hose on the filling device side and a hose on the vehicle side when an unexpected event such as a sudden start of the vehicle or a collision of the vehicle occurs during hydrogen gas filling. As such a safety joint, the applicant has proposed in JP-A-2021-101115 gazette, a safety joint with valve elements having improved sealing property in an entire pressure range from low pressure to high pressure, the safety joint composed of cylindrical plug bodies in which flow passages are formed, and valve elements (valve elements disposed in the flow passages of the plug bodies and pressed against valve seats formed on plug bodies by elastic materials) that are disposed on the same line in the plug bodies and pressed by the elastic materials, the valve elements including first seal means (tapered portions of the valve elements) that are attached to and detached from the valve seats formed on the plug bodies, and second seal means such as O-rings that come into contact with the flow passages formed in the plug bodies.

The safety joint disclosed in the patent document is useful, but since an ultrahigh-pressure hydrogen gas flows at high speed through the flow passage in the safety joint during filling, the O-ring that constitutes the second sealing means in the valve body in the plug body may come off. In addition, if a foreign matter is mixed in the hydrogen gas to be filled, the foreign matter may come into contact with the O-ring and damage the O-ring. Since the safety joint is newly developed, no technique for preventing the O-ring from coming off or being damaged has been proposed at present.

The content of JP-A-2021-101115 gazette is incorporated herein by reference in its entirety.

BRIEF SUMMARY

The present invention has been proposed in view of the above-mentioned problems of the prior art, and the object thereof is to provide a safety joint that can prevent the O-ring from falling off due to the ultra-high pressure hydrogen gas flowing through the flow passage in the safety joint at high speed and from being damaged by the foreign matter coming into contact with the O-ring if the foreign matter is mixed in the hydrogen gas.

A safety joint 100 according to the present invention is characterized by including: a plug body 11 having a flow passage 11A-3 with a small inner diameter that is open at one end and a flow passage 11A-2 with a large inner diameter that communicates with the flow passage 11A-3 with a small inner diameter via a tapered valve seat 11B; a valve body 12 having a small-diameter portion 12C and a large-diameter portion 12A continuous with the small-diameter portion 12C via a tapered portion 12B; an elastic body 13 that presses the valve body 12 in a direction of the two flow passages 11A-2, 11A-3 in the plug body 11; a hollow-shaped cover 15 having a plurality of projections 15A on an outer peripheral portion 15B thereof, the cover 15 being disposed in the flow passage 11A-2 with a large inner diameter of the plug body 11 so as to surround the valve body 12; a first sealing means 12S1 formed by the tapered portion 12B of the valve body 12 coming into contact with the valve seat 11B of the plug body 11; a second sealing means 12S2 provided in the small-diameter portion 12C of the valve body 12 and abutting against an inner wall of the flow passage 11A-3 with a small inner diameter of the plug body 11, wherein when the tapered portion 12B of the valve body 12 is not seated on the valve seat 11B of the plug body 11, the cover 15 surrounds at least a portion of a region from the second sealing means 12S2 to the large-diameter portion 12A side of the valve body 12, and a flow passage is formed by the adjacent projections 15A and the outer peripheral portion 15B of the cover 15, and an inner peripheral surface of the flow passage 11A-2 with a large inner diameter of the plug body 11.

In the safety joint 100 according to the present invention the small-diameter portion 12C and the large-diameter portion 12A of the valve body 12 may be formed in a disc shape; a tip rod-shaped region 12D continuous with the large-diameter portion 12A may be provided; an outer diameter of the large-diameter portion 12A may be larger than an inner diameter of the flow passage 11A-3 with a small inner diameter of the plug body 11; and the small-diameter portion 12C can enter the flow passage 11A-3 with a small inner diameter of the plug body 11. In addition, in the present invention, the hollow part of the cover 15 may have a region 15-C1 with a large inner diameter formed on the side of the flow passage 11A-3 with a small inner diameter of the plug body 11 and a region 15-C2 with a small inner diameter formed on the side of the flow passage 11A-2 with a large inner diameter of the plug body 11, and the valve body 12 can enter the region 15-C1 with a large inner diameter in the hollow portion of the cover 15; and the disk-shaped large-diameter portion 12A of the valve body 12 cannot enter the region 15-C2 with a small inner diameter in the hollow portion of the cover 15, and the tip rod-shaped region 12D of the valve body 12 can enter the region 15-C2 with a small inner diameter in the hollow part of the cover 15.

A safety joint 100-1 according to the present invention is characterized by including: a plug body 11 having a flow passage 11A-3 with a small inner diameter that is open at one end and a flow passage 11A-2 with a large inner diameter that communicates with the flow passage 11A-3 with a small inner diameter via a tapered valve seat 11B; a valve body 12 having a small-diameter portion 12C and a large-diameter portion 12A continuous with the small-diameter portion 12C via a tapered portion 12B; an elastic body 13 that presses the valve body 12 in a direction of the two flow passages 11A2, 11A-3 in the plug body 11; a first sealing means 12S1 formed by the tapered portion 12B of the valve body 12 coming into contact with the valve seat 11B of the plug body 11; a recess 11D formed in an inner wall of the flow passage 11A-3 with a small inner diameter of the plug body 11; a second sealing means 12S2-1 accommodated in the recess 11D; and a shutter 16 sliding on the inner wall of the flow passage 11A-3 with a small inner diameter of the plug body 11 to open or block the recess 11D.

According to the present invention with the above-described construction, since a member (cover 15) that covers the second sealing means 12S2 (for example, the O-ring 14) is provided, when the valve is opened, the second sealing means 12S2 can be prevented from coming off and breakage due to inflow of a hydrogen gas. Here, when the joint 10 on the filling device side and the joint 20 on the filling hose side are separated, the valve body 12 is seated on the valve seat 11B to close the valve, so that no hydrogen gas flows through the plugs (10, 20). There is no fear that the second sealing means 12S2 will fall off, and there is no fear that a foreign substance in the hydrogen gas will damage the second sealing means 12S2. On the other hand, when the joint 10 on the filling device side and the joint 20 on the filling hose side are connected, the valve body 12 is separated from the valve seat 11B and the valve is open, which causes a hydrogen gas to be supplied to the plugs 10 and 20 at high speed. There is a possibility that the second sealing means 12S2 may fall off or be damaged. However, according to the present invention, for example, since the second sealing means 12S2 is covered with the cover 15, the high-pressure hydrogen gas flow does not directly act on the second sealing means 12S2, and the second sealing means 12S2 is prevented from coming off. Since no hydrogen gas flow through the cover 15, even if a foreign matter enters the hydrogen gas, the foreign matter will not damage the second sealing means 12S2.

Here, the cover 15 is hollow and accommodates the valve body 12 in its hollow portion. When the valve body 12 is accommodated in the cover 15, the hollow portion engages with the valve body 12, which increases the resistance to fluid of the hollow portion of the cover 15. As a result, a hydrogen gas does not flow into the hollow portion, but flows through the outer peripheral portion 15B of the cover 15 with low resistance. No high-speed hydrogen gas flow is generated in the hollow portion of the cover 15 accordingly, and the second sealing means 12S2 attached to the valve body 12 is not exposed to the high-speed hydrogen gas flow. As a result, the second sealing means 12S2 of the valve body 12 accommodated in the hollow portion of the cover 15 will not fall off due to the hydrogen gas flow. Further, since the velocity of the hydrogen gas flow is slow in the cover internal space 15C, even if a foreign matter enters and collides with the second sealing means 12S2, the second sealing means 12S2 will not be damaged.

Alternatively, according to the present invention, the recess 11D is formed in the region 11A-3 of the hydrogen gas flow passage 11A-3 with a small inner diameter, and the second sealing means 12S2 is fitted into the recess 11D to form a sealing mechanism, and the shutter 16 for covering or opening the recess 11D is provided, and when the safety joint 100-1 is connected (normally: open), the shutter 16 covers the O-ring fitting recess 11D of the hydrogen gas passage. With this, the second sealing means 12S2 covered by the shutter 16 is not exposed to the ultrahigh-pressure, high-speed hydrogen gas flow, and the second sealing means 12S2 does not come off. Also, even if a foreign matter is mixed into the hydrogen gas, the shutter 16 prevents the foreign matter in the hydrogen gas from coming into contact with the second sealing means 12S2, thereby preventing damage to the second sealing means 12S2.

BRIEF DESCRIPTION OF THE DRAWINGS

FIG. 1 is an explanatory cross-sectional view showing a conventional safety joint.

FIG. 2 is a cross-sectional view of the safety joint shown in FIG. 1 is assembled.

FIG. 3 is an explanatory cross-sectional view showing a state in which the safety joint according to the first embodiment of the present invention is separated, and a valve body is seated on a valve seat to close a valve.

FIG. 4 is side view of the valve body used in the first embodiment.

FIG. 5 is a perspective view of the cover used in the first embodiment.

FIG. 6 is a cross-sectional view of the cover shown in FIG. 5.

FIG. 7 is an explanatory cross-sectional view showing a state in which the safety joint according to the first embodiment of the present invention is not separated, and the valve body is separated from the valve seat to close the valve.

FIG. 8 is an explanatory cross-sectional view showing a main part of the safety joint according to the second embodiment of the present invention.

DETAILED DESCRIPTION

Hereinafter, embodiments of the present invention will be described with reference to the accompanying drawings. In order to facilitate understanding of the embodiments of the present invention, first, an outline of the prior art described in the patent document will be explained with reference to FIGS. 1 and 2. FIG. 1 shows the safety joint 100 in the prior art, which is composed of a joint 10 on the side of a hydrogen gas filling device and a joint 20 (FIG. 2) on the side of a filling hose. In the attached drawings, illustration of the hydrogen gas filling device and the filling hose is omitted. FIG. 1 shows a state in which the joint 10 is separated from the joint 20. Although the joint 10 and the joint 20 have similar structural members (plug bodies 1, 11, valve bodies 2, 12, elastic members 3, 13, etc.), the similar structural members of the joints 10, 20 are indicated by different reference numerals. The valve bodies 2 and 12 and the plug bodies 1 and 11 are made of metal. The joint 20 is constructed similarly to the joint 10.

In FIG. 1, the plug body 1 is formed with a flow passage 1A (1A-1 to 1A-3) and a valve accommodating portion 1C for accommodating a valve body 2 therein. The flow passage 1A includes a small-diameter region 1A-1 communicating with the filling device (existing the top in FIG. 1), a large-diameter region 1A-2 relating to the valve accommodating portion 1C, and a small diameter region 1A-3 communicating with a filling hose (existing the bottom in FIG. 1). The valve accommodating portion 1C constitutes a part of the flow passage 1A. In FIG. 1, in the valve accommodating portion 1C of the plug body 1 is accommodated the valve body 2 so as to be movable in the flow direction of the flow passage 1A (vertical direction in FIG. 1). A spring 3 is arranged on the filling device side of the valve body 2 (above the valve body 2 in FIG. 1). The spring 3 urges the valve body 2 toward the filling hose (downward in FIG. 1), so that the valve body 2 is always pressed toward a tapered valve seat 1B formed at the lower end of the valve accommodating portion 1C.

In FIG. 1, the valve body 2 arranged in the valve body accommodating portion 1C is composed of a large diameter portion 2A, a tapered portion 2B, and a small diameter portion 2C. The tapered portion 2B is formed at one end (lower end in FIG. 1) of the large diameter portion 2A, and is formed so as to be able to abut against the tapered valve seat 1B formed in the plug body 1. A groove 2G is formed in the small diameter portion 2C of the valve body 2, and an O-ring 4 as a sealing member is accommodated in the groove 2G. The small diameter portion 2C of the valve body 2 can be inserted into the region 1A-3 on the filling hose side (lower side in FIG. 1) of the flow passage 1A, and when the joint 10 on the filling device side and the joint 20 on the filling hose side are separated (the case shown in FIG. 1), the small diameter portion 2C is inserted into the region 1A-3. On the other hand, when the joint 10 and the joint 20 are connected (in the case of FIG. 2), the small diameter portion 2C is located on the filling device side (above in FIG. 1) from the region 1A-3, and is not inserted in the region 1A-3.

In FIG. 1, the tapered valve seat 1B formed in the valve accommodating portion 1C and the tapered portion 2B formed at one end of the large diameter portion 2A of the valve body 2 constitute a first sealing means 2S1. When the tapered portion 2B of the valve body 2 is seated on the valve seat 1B of the plug body 1, the valve (first sealing means 2S1) is closed, and the state shown in FIG. 1 is obtained. On the other hand, when the tapered portion 2B of the valve body 2 separates from the valve seat 1B of the plug body 1, the first sealing means 2S1 is opened and enters the state shown in FIG. 2. Since both the valve body 2 and the plug body 1 are made of metal, when the valve body 2 is seated on the valve seat 1B, a metal seal is formed to ensure airtightness. In particular, when the fluid fuel is at high pressure, the first sealing means 2S1 exhibits excellent sealing performance as well as pressure resistance.

In FIG. 1, the O-ring 4 accommodated in the groove 2G of the small diameter portion 2C of the valve body 2 contacts the inner wall surface of the region 1A-3 on the hose side of the flow passage 1A when the joint 10 and the joint 20 are separated, and the O-ring 4 and the inner wall surface of the region 1A-3 constitute a second sealing means 2S2. The contact of the O-ring 4 with the region 1A-3 allows the second sealing means 2S2 to exhibit sealing performance. On the other hand, when the small diameter portion 2C moves toward the valve accommodating portion 1C of the plug body 1 and the O-ring 4 does not come into contact with the filling hose side region 1A-3 (state shown in FIG. 2), the second sealing means 2S2 cannot exhibit sealability. The contact (or contact in a sliding state) of the inner wall surface of the filling hose-side region 1A-3 and the O-ring 4 of the second sealing means 2S2 improve the sealing performance at low pressure.

When the safety joint 100 shown in FIG. 2 is assembled, that is, when the joint 10 on the filling device side and the joint 20 on the filling hose side are connected, there is a rod 8 between the joint 10 and the joint 20. The end portion of the rod 8 on the side of the filling device (upper in FIG. 2) presses the valve body 2 on the side of the filling device, pushing the valve body 2 against the elastic force of the spring to separate the valve body 2 from the valve seat 1B. On the other hand, the end of the rod 8 on the filling hose side (lower in FIG. 2) presses the valve body 12 on the filling hose side to separate the valve body 12 from a valve seat 11B. As a result, the first sealing means 2S1 and 12S1 (a valve constituted by the tapered portion 2B of the valve body 2 and the valve seat 1B and a valve constituted by the tapered portion 12B of the valve body 12 and the valve seat 11B) are opened. At the same time, in the second sealing means 2S2 and 12S2, since the small diameter portion 2C is not inserted in the region 1A-3, and the small diameter portion 12C is not inserted in the region 11A-3, the O-ring 4 and the O-ring 14 are not in contact with the inner wall surfaces of the regions 1A-3, 11A-3, resulting in no sealing functions. The hydrogen gas consequently can flow from the filling device side to the filling hose side (fuel tank side of the vehicle) through the safety joint 100 (flow passages 1A and 11A of the joints 10 and 20) without being sealed.

When a hydrogen gas filling hose (not shown) is subjected to a tensile force greater than expected during hydrogen gas filling, the joint 10 on the filling device side and the joint 20 on the filling hose side are separated by a known mechanism (not shown). When the joint 10 and the joint 20 are separated, the rod 8 is disengaged from the joints 10 and 20, so that the valve bodies 2 and 12 are pressed by the springs 3 and 13, respectively to move toward the valve seats 1B and 11B of the plug bodies 1 and 11, the tapered portions 2B and 12B of the valve bodies 2 and 12 are seated on the valve seats 1B and 11B, and the first sealing means 2S1 and 12S1 are closed. When the joint 10 and the joint 20 are separated, the small diameter portions 2C and 12C of the valve bodies 2 and 12 are inserted into the regions 1A-3 and 11A-3, so that the second sealing means 2S2 constituted by the O-ring 4 and the filling hose side region 1A-3 and the second sealing means 12S2 constituted by the O-ring 14 and the filling hose side region 11A-3 exhibit sealing functions. As a result, when the joint 10 and the joint 20 are separated, the hydrogen gas (fluid fuel) on the filling device side is prevented from flowing out through the joint 10, and the hydrogen gas on the filling hose side is prevented from flowing out through the joint 20.

Next, the first embodiment of the present invention will be described with reference to FIGS. 3 to 7. As described above, during filling, since an ultra-high pressure hydrogen gas flows at high speed through the flow passages 1A-2 and 11A-2 in the safety joint, there is a risk that the O-rings 4 and 14 constituting the second sealing means may fall off. Moreover, if a foreign matter is mixed in the hydrogen gas to be filled, the foreign matter may come into contact with the O-rings 4 and 14 and damage them. In the present invention, a member is provided to cover the O-rings 4 and 14 when the valve is opened, thereby preventing the O-rings 4 and 14 from coming off or being damaged due to inflow of hydrogen gas.

When the outline of the prior art was explained with reference to FIGS. 1 and 2, the joint 10 on the filling device side was illustrated and explained, but in the explanation of the first embodiment shown in FIGS. 3 to 7, the joint 20 will be illustrated and explained. As mentioned above, the joint 10 and the joint 20 have similar components. The joint 10 or 20 according to the first embodiment includes a cover 15 (a structure not provided in the prior art of FIGS. 1 and 2) as a member that covers the O-rings 4 and 14 when the valve is opened. Since the cover 15 is provided and functions, the shape of the valve body 12 (2), etc. in the first embodiment shown in FIGS. 3 to 7 are different from those of the prior art show in FIGS. 1 and 2. However, the same reference numerals as in FIGS. 1 and 2 are used for the reference numerals of the members corresponding to the prior art shown in FIGS. 3 to 7. FIGS. 3 to 7 show the members on the side of the joint 20, and do not show the members on the side of the joint 10.

FIG. 3 shows a state in which the joint 10 on the side of the filling device (not shown) and the joint 20 on the side of the filling hose are separated. In FIG. 3, the plug body 11 of the joint 20 is formed with a flow passage 11A (11A-1 to 11A-3) and a valve body accommodating portion 11C, and a valve body 12 is accommodated in the valve body accommodating portion 11C. The flow passage 11A includes a small-diameter region 11A-3 communicating with the filling device side (upper side in FIG. 3), a large-diameter region 11A-2 forming the valve accommodating portion 11C, and a small-diameter region 11A-1 communicating with the filling hose side (lower side in FIG. 3). The valve accommodating portion 11C is in communication with a filling device (not shown) through a region 11A-3, and is in communication with a filling hose (not shown) through a region 11A-1. The direction of hydrogen gas flow is indicated by the arrow Y in FIGS. 3 and 7. In FIG. 3 in which the joint 10 on the filling device side (not shown) is separated, no hydrogen gas flows, and the arrow Y indicates an imaginary direction of hydrogen gas flow when the hydrogen gas flows. A hydrogen gas flows from the joint 10 (plug body 1, see FIG. 1) on the filling device side to the joint 20 on the filling hose side (plug body 11) (in the direction of the arrow Y1), and flows from the filling hose side coupling 20 (plug body 11) to the filling hose (not shown) (arrow Y2). In the joint 10 (see FIG. 1), the direction of hydrogen gas flow is opposite to the directions Y1 and Y2 shown in FIG. 3.

In FIG. 3, the valve body 12 is accommodated in the valve body accommodating portion 11C of the plug body 11 so as to be movable in the direction of the flow passage 11A (longitudinal direction of the flow passage 11A: vertical direction in FIG. 3). A spring 13 is arranged on the filling hose side (lower in FIG. 3) of the valve body 12. The spring 13 urges the valve body 12 toward the filling device (upward in FIG. 3), so that the valve body 12 is always pressed toward the tapered valve seat 11B formed at the upper end of the valve body accommodating portion 11C. The valve body 12 and the plug body 11 are made of metal. A groove 12G is formed in the small diameter portion 12C of the valve body 12, and an O-ring 14 as a sealing member is fitted (accommodated) in the groove 12G. The small-diameter portion 12C of the valve body 12 can be inserted into a region 11A-3 on the filling device side (upper side in FIG. 3) of the flow passage 11A, and when the joint 10 and the joint 20 separate from each other as shown in FIG. 3, the small diameter portion 12C is inserted into the region 11A-3, and the valve body 12 is seated on the tapered valve seat 11B formed at the upper end of the valve body receiving portion 11C. On the other hand, in the case shown in FIG. 7, that is, when the joint 10 on the filling device side and the joint 20 on the filling hose side are coupled, the small diameter portion 12C is not inserted into the region 11A-3, and is located on the filling hose side (lower in FIG. 3) of the region 11A-3.

As described above, the valve body 12 is positioned in the valve body accommodating portion 11C (region 11A-2) in FIG. 3. The details of the valve body 12 are shown in FIG. 4. The valve body 12 will be described below with reference to FIGS. 3 and 4. The valve body 12 includes a large diameter portion 12A, a tapered portion 12B formed at one end of the large diameter portion 12A and abutting against the valve seat 11B, and a small diameter portion 12C extending upward in FIG. 4 from the tapered portion 12B. Further, the valve body 12 has a tip rod-shaped region 12D near the end (front end side) on the side (lower side in FIG. 4) separated from the small diameter portion 12C. The large-diameter portion 12A is continuous with the tip rod-shaped region 12D via a stepped portion, and has a disc shape. The outer diameter of the large diameter portion 12A is larger than the inner diameter of the region 11A-3. The small diameter portion 12C is continuous with the large diameter portion 12A via the tapered portion 12B, and has a smaller outer diameter than the large diameter portion 12A. The outer diameter of the small diameter portion 12C is smaller than the inner diameter of the region 11A-3, so that it can enter the region 11A-3. A tapered portion 12DT is formed on the tip side (filling hose side, lower side in FIGS. 3 and 4) of the tip rod-shaped region 12D in order to reduce the resistance to the hydrogen gas flow. Although not shown, the small diameter portion 12C of the valve body 12 can be tapered at the filling device side end (upper side in FIG. 3) to reduce resistance to reverse hydrogen gas flow.

In FIGS. 3 and 4, the tapered portion 12B formed at one end of the large diameter portion 12A of the valve body 12 and the valve seat 11B formed in the plug body 11 constitute a first sealing means 12S1. When the tapered portion 12B of the valve body 12 is seated on the valve seat 11B of the plug body 11, the first sealing means 12S1 is closed (the state shown in FIG. 3). On the other hand, when the tapered portion 12B of the valve body 12 is separated from the valve seat 11B of the plug body 11, the first sealing means 12S1 is opened (the state shown in FIG. 7). The first sealing means 12S1, which is composed of the valve body 12 and the plug body 11 both made of metal, forms a metal seal when the tapered portion 12B of the valve body 12 is seated on the valve seat 11B. In particular, when the fluid fuel is at high pressure, it exhibits excellent pressure resistance as well as excellent sealing performance.

In FIGS. 3 and 4, the O-ring 14 accommodated in the groove 12G formed in the small-diameter portion 12C of the valve body 12 will be in contact with the inner wall surface of the region 11A-3 of the flow passage 11A on the filling device side when the joint 10 (FIG. 1) on the filling device side and the joint 20 on the filling hose side are separated (the state shown in FIG. 3). The O-ring 14 and the inner wall surface of the region 11A-3 constitute the second sealing means 12S2. When the O-ring 14 contacts with the inner wall surface of the region 11A-3, the sealing performance is exhibited, and the second sealing means 12S2 is closed. FIG. 4 shows the state in which the O-ring 14 is incorporated into the valve body 12. On the other hand, when the small diameter portion 12C moves toward the valve accommodating portion 11C of the plug body 11 and the O-ring 14 does not contact with the filling device side region 11A-3 (the state shown in FIG. 7), the second sealing means 12S2 is also in an open state and does not exhibit sealing performance. In the second sealing means 12S2, the contact (or sliding contact) between the inner wall surface of the region 11A-3 on the filling device side and the O-ring 14 improves the sealing performance at low pressure.

In FIG. 3, the valve body 12 located in the valve body accommodating portion 11C (the region 11A-2) is surrounded by a hollow cover 15. Details of the cover 15 are shown in FIGS. 5 and 6. The configuration and function of the cover 15 will be described with reference to FIGS. 3 to 6. As shown in FIG. 6, the cover 15 has hollow portions 15C (15C-1, 15C-2). The hollow portions 15C-1 and 15C-2 may be collectively referred to as the hollow portion 15C. As clearly shown in FIG. 6, the hollow portion 15C of the cover 15 has a region 15C-1 with a large inner diameter and a region 15C-2 with a small inner diameter. The region 15C-1 with a large inner diameter is formed on the side of the region 11A-3 with a small inner diameter of the passage in the assembled states shown in FIGS. 3 and 7. The disc-shaped large-diameter portion 12A of the valve body 12 can enter the region 15C-1 having a large inner diameter. In the assembled states of FIGS. 3 and 7, the region 15C-2 with a smaller inner diameter is formed on the side of the region 11A-2 with a larger inner diameter of the passage. The large-diameter portion 12A of the valve body 12 cannot enter the region 15C-2 with a small inner diameter. However, the tip rod-shaped region 12D of the valve body 12 can enter the region 15C-2 with a small inner diameter.

At least a portion of the valve body 12 is accommodated in the hollow portion 15C of the cover 15. That is, when the tapered portion 12B of the valve body 12 is separated from the valve seat 11B and is not seated on the valve seat 11B, that is, when the valve (first sealing member 12S1) is opened (in the case of FIG. 7), the region 15C-1 having a large inner diameter surrounds at least a portion of the region on the side of the large diameter portion 12A of the valve body 12 from the second sealing means 12S2 (O-ring 14). On the other hand, when the tapered portion 12B of the valve body 12 is seated on the valve seat 11B, that is, when the valve is closed (in the case of FIG. 3), the region 15C-1 having a large inner diameter in the hollow portion 15C surrounds at least a portion of the large diameter portion 12A and the small diameter portion 12C of the valve body 12.

As shown in FIG. 5, a plurality of projections 15A (guides or fins) is formed on the outer peripheral portion 15B of the cover 15, each of the projections 15A extending substantially over the entire length of the cover 15 in the direction of the flow passage. A hydrogen gas passage is formed by the projections 15A, the outer peripheral portion 15B of the cover 15, and the inner peripheral surface of the region 11A-2 having the larger inner diameter of the passage. A hydrogen gas flows through the hydrogen gas passage when the joint 10 on the filling device side and the joint 20 on the filling hose side are coupled as shown in FIG. 7. In the case shown in FIG. 3, that is, when the joint 10 and the joint 20 are separated, no hydrogen gas flows in the hydrogen gas flow passage formed by the protrusions 15A, the outer peripheral portion 15B of the cover 15, and the inner peripheral surface of the region 11A-2. Although not shown in FIGS. 5 and 6, guide grooves for guiding the projections 15A of the cover 15 when the cover 15 moves in the flow passage direction may be formed on the inner peripheral surface of the region 11A-2 where the inner diameter of the flow passage 11A is large. Such guide grooves may be omitted. In other words, the cover 15 may be rotatable inside the region 11A-2 of the flow passage 11A of the plug body 11 having a large inner diameter. Also, only a portion of the protrusion 15A needs to fit into the guide groove, and not all the protrusions 15A need to fit into the guide grooves.

In the illustrated first embodiment, when the valve is closed as shown in FIG. 3, the stopper 15D (FIG. 6) formed at the end portion of the cover 15 on the filling device side is engaged with the ceiling of the region 11A-2 having the large inner diameter on the side of the filling device to form a space K (FIG. 3). The space K may be omitted, and the end of the cover 15 on the side of the filling device may contact the ceiling of the region 11A-2. In other words, unless the cover 15 interferes with the ceiling portion of the region 11A-2 with a large inner diameter on the side of the filling device and does not cover the O-ring 14, the presence or absence of the space K shown in FIG. 3 doesn't matter. As shown in FIGS. 5 and 6, the cover 15 has a tapered portion 15E for reducing resistance at the end on the filling hose side (diagonally lower right in FIG. 5: lower in FIG. 6) as assembled. Although not shown, the end of the cover 15 on the filling device side (diagonally upper left in FIG. 5: upper in FIG. 6) as assembled can also be formed with a taper for reducing resistance. The tapered portion 15E described above is effective because it faces the flow of hydrogen gas when applied to the cover of the joint 10 on the filling device side. On the other hand, the taper not shown is effective in facing the hydrogen gas flow when applied to the cover 15 of the joint 20 on the filling hose side.

FIG. 7 shows the joint 20 on the filling hose side when the joint 10 on the filling device side and the joint 20 on the filling hose side are connected. The directions in which hydrogen gas flows in FIG. 7 are indicated by arrows Y (Y1, Y2). In FIG. 7, the rod 8 is interposed between the joint 10 and the joint 20, the end of the rod 8 on the filling hose side (lower in FIG. 7) pressing the valve body 12 on the filling hose side against the elastic force of the spring 13 to separate the tapered portion 12B of the valve body 12 from the valve seat 11B. Although not shown, the end of the rod 8 on the side of the filling device (upper in FIG. 7) presses the valve body 2 (not shown in FIG. 7) of the joint 10 on the side of the filling device, in the joint 10 also the rod 8 separates the tapered portion 2B of the valve body 2 from the valve seat 1B (FIGS. 1 and 2). As a result, the first sealing means 12S1 (a valve constituted by the tapered portion 12B of the valve body 12 and the valve seat 11B) of the joint 20 on the filling hose side is opened, and the first sealing means 2S1 of the joint 10 (not shown) on the filling device side is opened.

In FIG. 7, when the first sealing means 12S1 is opened, the small diameter portion 12C of the second sealing means 12S2 of the joint 20 on the filling hose side is not inserted into the region 11A-3 and the O-ring 14 is not in contact with the inner wall surface of the region 11A-3, so that the O-ring 14 does not perform its sealing function. Similarly, the O-ring 4 of the second sealing means 2S2 of the joint 10 (FIGS. 1 and 2) on the filling device side (not shown) does not contact with the inner wall surface of the region 1A-3, so that it does not exhibit its sealing function. Since the first sealing means 12S1 and 2S1 are in open states and the second sealing means 12S2 and 2S2 do not exhibit sealing functions, a high-pressure hydrogen gas flows from the hydrogen gas filling device side through the safety joint 100 (flow passages 1A and 11A of the joints 10, 20) to the filling hose side (fuel tank side of a vehicle).

In the state shown in FIG. 7, the region 15C-1 having a large inner diameter in the hollow portion 15C of the cover 15 surrounds at least a portion of an area on the side of the large diameter portion 12A of the valve body 12 from second sealing means 12S2 (O-ring 14). The second sealing means 12S2 (O-ring 14) can be protected accordingly against a high-pressure hydrogen gas flow passing through the flow passage formed in the outer peripheral portion 15B of the cover 15. The function of protecting the second sealing means 12S2 (O-ring 14) by the cover 15 will be described later.

As shown in FIG. 2, there is a possibility that the O-ring 14 may fall off or be damaged when the valve is opened and high pressure hydrogen gas flows into the flow passage 11A. However, according to the first embodiment shown in FIGS. 3 to 7, the O-ring 14 accommodated in the recess 12G of the valve plug 12 is surrounded and protected by the cover 15, which prevents the O-ring 14 from falling off out of the groove 12G. In addition, as will be described later, hydrogen gas does not flow in the internal space 15C of the cover 15, even if a foreign matter enters, the foreign matter will not contact the O-ring 14, and the O-ring 14 will not be damaged.

The flow of hydrogen gas in the cover 15 will be described. In FIG. 7 in which the valve is open, the valve body 12 and the cover 15 are in contact with each other as indicated by the symbol F. Specifically, the end surface of the large-diameter portion 12A of the valve body 12 on the side of the tip rod-shaped region 12D and the stepped portion of the hollow portion 15C of the cover 15 come into contact with each other at the location indicated by the symbol F. When the end surface of the large diameter portion 12A of the valve body 12 and the stepped portion of the cover 15 contact with each other, a part of the valve body 12 is accommodated inside the cover 15 (hollow portion 15C). With this, an annular space is formed between the outer surface of the valve body 12 and the inner surface of the hollow portion 15C of the cover 15, the radial distance in the annular space is small and the resistance to fluid is large, which makes it difficult for hydrogen gas to flow. On the other hand, the resistance to fluid of the hydrogen gas flow passages radially outward of the cover 15 (the flow passages configured by the projections 15A, the outer peripheral portion 15B and the inner peripheral surface of the region 11A-2 having a large inner diameter) is much smaller in comparison to the resistance to fluid in the hollow portion 15C of the cover 15. Therefore, the hydrogen gas hardly flows downstream side (filling hose side) of the portion indicated by the symbol F, and flows through the passage configured by the adjacent projections 15A of the cover 15, the outer peripheral portion 15B and the inner peripheral surface of the region 11A-2 having a large inner diameter of the flow passage.

A hydrogen gas hardly flows into the hollow portion 15C inside the cover 15, which has high resistance to fluid. However, the flow rate of hydrogen gas flowing through the hollow portion 15C of the cover 15 does not necessarily have to be zero (0). The resistance to fluid of the hollow portion 15C is more significant than that of the flow passage outside the cover 15 (the hydrogen gas flow passage composed of the adjacent projections 15A, the outer peripheral portion 15B, and the inner peripheral surface of the region 11A-2 having a large inner diameter of the flow passage) should be as large as possible. In addition, a sealing material may be arranged at a contact point indicated by symbol F (the point at which the end surface of the large-diameter portion 12A of the valve body 12 and the stepped portion of the hollow portion 15C of the cover 15 contact) so that the flow rate of hydrogen gas through the hollow portion 15C of the cover 15 can be zero.

The flow rate of the hydrogen gas flowing through the hollow portion 15C of the cover 15 is small (or does not flow), and the hydrogen gas flows through the flow passage with low resistance on the outer peripheral side of the cover 15. As a result, the flow velocity of the hydrogen gas flow in the hollow portion 15C of the cover 15 becomes very low or zero, and the O-ring 14 of the valve body 12 accommodated in the hollow portion 15C of the cover 15 will not fall off due to the hydrogen gas flow flowing through the hollow portion 15C. In the hollow portion 15C, since the flow velocity of the hydrogen gas flow becomes slow (or becomes zero), even if the hydrogen gas mixed with a foreign matter collides with the O-ring 14, the O-ring 14 will not be damaged.

A second embodiment of the present invention will now be described with reference to FIG. 8. In the safety joint 100-1 of the second embodiment shown in FIG. 8, grooves (concave portions) are formed on the hydrogen gas flow passages 1A and 11A in the plug bodies 1 and 11 of the filling device side joint 10 and the filling hose side joint 20, respectively are formed, and the O-rings 4 and 14 are fitted in the grooves (recesses). In that respect, it differs from the first embodiment shown in FIGS. 3 to 7. In the second embodiment shown in FIG. 8, redundant description of the same configuration as that of the first embodiment shown in FIGS. 3 to 7 will be avoided. Similar to the first embodiment of FIGS. 3-7, the second embodiment of FIG. 8 will be described with respect to the joint 20 on the filling hose side. The joint 10 on the filling device side is not shown.

In FIG. 8, a concave portion 11D (groove) is formed in the inner wall of the region 11A-3 of the filling hose side plug body 11 where the inner diameter of the passage is small. An O-ring 14 constituting a second sealing means is fitted (or housed) in the recess 11D. When the joint 20 on the filling hose side and the joint 10 on the filling device side are separated and the valve is closed (the state shown in FIG. 3 of the first embodiment), although the O-ring 14 and the outer circumference of the valve body 12 (small diameter portion 12C) constitutes the second sealing means 12S2-1, the second sealing means 12S2-1 is not formed in FIG. 8 showing the valve open state. The region 11A-3 having a small inner diameter of the flow passage 11A is provided with a shutter 16 that slides on the inner wall surface of the region 11A-3 to open or close the recess 11D. The shutter 16 is interlocked with the axial movement of the valve body 12, and when the valve is opened (the state of FIG. 7 of the first embodiment: the state where the joint 20 on the filling hose side and the joint 10 on the filling device side are connected), the shutter 16 closes (blocks) the recess 11D, when the valve is closed (the state shown in FIG. 3 of the first embodiment), the shutter 16 opens the recess 11D. In FIG. 8, the reference numeral 16(A) indicates the shutter 16 positioned to close the recess 11D when the valve is opened. The reference numeral 16(B) denotes the shutter 16 positioned to open the recess 11D when the valve is closed. As a mechanism for moving the shutter 16 (for example, in conjunction with movement of the valve body 12), a conventionally known mechanism can be adopted.

In FIG. 8, when the joints 10 and 20 on the filling device side and the filling hose side are connected (when the valve is open: the state of FIG. 7 of the first embodiment), since the joint recess 11D, for the O-ring 14, in the region 11A-3 of the flow passage 11A is closed by the shutter 16 at position 16(A), the O-ring 14 is fitted in the recess 11D is protected. As a result, the O-ring 14 is prevented from falling off by the high-pressure, high-speed hydrogen gas flowing through the flow passage 11A, and even if a foreign matter is mixed in the hydrogen gas, the O-ring 14 will not come into contact with the foreign matter and will not be damaged. On the other hand, when the joints 10 and 20 are separated (when the valve is closed: the state shown in FIG. 3 of the first embodiment), in conjunction with the valve body 12 moving to close the valve, the shutter 16 is moved to the position shown by 16(B) to open the recessed part 11D, and to expose the O-ring 14. The exposed O-ring 14 cooperates with the outer peripheral surface of the small-diameter portion 12C of the valve body 12 to serve as the second sealing means 12S2-1 and exhibit sealing performance at low pressure. Other configurations and effects of the second embodiment shown in FIG. 8 are the same as those of the first embodiment shown in FIGS. 3 to 7.

It should be noted that the illustrated embodiments are merely examples and are not intended to limit the technical scope of the present invention.

DESCRIPTION OF THE REFERENCE NUMERALS

1, 11 plug bodies
1A, 11A flow passages 1A-2, 11A-2 regions with large inner diameter
1A-3, 11A-3 regions with small inner diameter
1B, 11B valve seats
1C, 11C valve accommodating portions
1D, 11D concave portions
2, 12 valve bodies
2A, 12A large diameter portions of valve bodies
2B, 12B tapered portions of valve bodies
2C, 12C small diameter portions of valve bodies
2D, 12D tip rod-shaped regions
2S1, 12S1 first sealing means
2S2, 12S2, 2S2-1, 12S2-1 second sealing means
3, 13 elastic members
4, 14 O-rings
15 cover
15A projection (guides or fins)
15B outer peripheral portion of covers
15C hollow portions of cover
15C-1 hollow portion with large inner diameter of cover
15C-2 hollow portion with small inner diameter of cover
16 shutter
100, 100-1 safety joints

The invention claimed is:

1. A safety joint comprising:
a plug body having a flow passage with a small inner diameter that is open at one end and a flow passage with a large inner diameter that communicates with the flow passage with the small inner diameter via a tapered valve seat;
a valve body having a small-diameter portion and a large-diameter portion continuous with the small-diameter portion via a tapered portion;
an elastic body that presses the valve body in a direction of the two flow passages in the plug body;
a hollow-shaped cover having a plurality of projections on an outer peripheral portion thereof, the cover being disposed in the flow passage with the large inner diameter of the plug body so as to surround the valve body;
a first sealing means formed by the tapered portion of the valve body coming into contact with the valve seat of the plug body;
a second sealing means provided in the small-diameter portion of the valve body and abutting against an inner wall of the flow passage with the small inner diameter of the plug body,
wherein when the tapered portion of the valve body is not seated on the valve seat of the plug body, the cover surrounds at least a portion of a region from the second sealing means to the large-diameter portion side of the valve body, and a flow passage is formed by the adjacent projections and the outer peripheral portion of the cover, and an inner peripheral surface of the passage with the large inner diameter of the plug body.

2. The safety joint as claimed in claim 1, wherein the small-diameter portion and the large-diameter portion of the valve body are formed in a disc shape;
a tip rod-shaped region continuous with the large-diameter portion is provided;
an outer diameter of the large-diameter portion is larger than an inner diameter of the flow passage with the small inner diameter of the plug body; and
the small-diameter portion can enter the flow passage with the small inner diameter of the plug body.

3. The safety joint as claimed in claim 2, wherein a hollow part of the cover has a region with a large inner diameter formed on the side of the flow passage with the small inner diameter of the plug body and a region with a small inner diameter formed on the side of the flow passage with the large inner diameter of the plug body, and the valve body can enter the region with the large inner diameter in the hollow portion of the cover; and
the disk-shaped large-diameter portion of the valve body cannot enter the region with the small inner diameter in the hollow portion of the cover, and the tip rod-shaped region of the valve body can enter the region with the small inner diameter in the hollow part of the cover.

4. A safety joint comprising:
a plug body having a flow passage with a small inner diameter that is open at one end and a flow passage with a large inner diameter that communicates with the flow passage with the small inner diameter via a tapered valve seat;
a valve body having a small-diameter portion and a large-diameter portion continuous with the small-diameter portion via a tapered portion;
an elastic body that presses the valve body in a direction of the two flow passages in the plug body;
a first sealing means formed by the tapered portion of the valve body coming into contact with the valve seat of the plug body;
a recess formed in an inner wall of the flow passage with a small inner diameter of the plug body;
a second sealing means accommodated in the recess; and
a shutter sliding on the inner wall of the flow passage with a small inner diameter of the plug body to open or block the recess.

* * * * *